United States Patent
Yamada et al.

[11] Patent Number: 5,972,536
[45] Date of Patent: Oct. 26, 1999

[54] NEGATIVE ELECTRODE MATERIAL FOR NON-AQUEOUS LIQUID ELECTROLYTE SECONDARY CELL, METHOD FOR PRODUCING SAME AND NON-AQUEOUS LIQUID ELECTROLYTE SECONDARY CELL EMPLOYING SAME

[75] Inventors: Shinichiro Yamada; Hiroyuki Akashi; Hiroshi Imoto; Hideto Azuma; Kenichi Kitamura, all of Kanagawa; Momoe Adachi, Tokyo; Terue Sasaki; Kohichi Tanaka, both of Kanagawa, all of Japan

[73] Assignee: Sony Corporation, Tokyo, Japan

[21] Appl. No.: 09/052,503

[22] Filed: Mar. 31, 1998

Related U.S. Application Data

[62] Division of application No. 08/737,285, filed as application No. PCT/JP96/00548, Mar. 6, 1996, Pat. No. 5,834,138.

[30] Foreign Application Priority Data

| Mar. 6, 1995 | [JP] | Japan | P7-074611 |
| Jul. 27, 1995 | [JP] | Japan | P7-212671 |
| Oct. 4, 1995 | [JP] | Japan | P7-284582 |
| Nov. 22, 1995 | [JP] | Japan | P7-328390 |
| Mar. 6, 1996 | [JP] | Japan | 8-00548 |

[51] Int. Cl.$^6$ .................................................. H01M 4/60
[52] U.S. Cl. .......................... 429/231.4; 429/231.8; 423/445 R
[58] Field of Search ................ 429/231.4, 231.8; 423/445 R, 447.9, 448, 461

[56] References Cited

U.S. PATENT DOCUMENTS

| Re. 33,306 | 8/1990 | Hayashi et al. ........................... 429/194 |
| 1,379,222 | 5/1921 | Seaman .................................... 429/194 |
| 1,462,752 | 7/1923 | Jacobs . | |
| 1,538,505 | 5/1925 | Atkinson . | |

(List continued on next page.)

FOREIGN PATENT DOCUMENTS 0 660 432 A1  6/1995  European Pat. Off. .

(List continued on next page.)

OTHER PUBLICATIONS

T. Ohzuku, et al., Formation of Lithium–Graphite Intercalation Compounds in Nonaqueous Electrolytes and Their (List continued on next page.)

Primary Examiner—Maria Nuzzolillo
Assistant Examiner—Carol Chaney
Attorney, Agent, or Firm—Hill & Simpson

[57] ABSTRACT

A negative electrode material for a secondary cell for anon-aqueous liquid electrolyte for realizing a high charging/discharging capacity and a high discharging efficiency, a method for producing such material and a non-aqueous liquid electrolyte secondary cell employing such material. The negative electrode material contains at least one carbonaceous material selected from the group consisting of coffee beans, tea leaves, cane sugar, corns, fruits, straws of cereals and husks of cereals, a carbonaceous material derived from a plant-origin high molecular material containing a sum total of 0.2 to 20 wt % of metal elements, phosphorus and sulphur calculated as elements or a carbonaceous material having a diffraction peak between 30° and 32° of the 2θ diffraction angle in the X-ray (CuKα) powder diffraction pattern. For producing the negative electrode material, at least one carbonaceous material selected from the group consisting of coffee beans, tea leaves, cane sugar, corns, fruits, straws of cereals and husks of cereals, or crystalline or fibrous cellulose admixed with at least one of metal elements, phosphorus or sulphur, is sintered for carbonization. The negative electrode material is used for a non-aqueous liquid electrolyte secondary cell having a positive electrode formed of a lithium compound oxide and a negative electrode formed of a carbonaceous negative electrode material capable of doping and dedoping lithium ions as an active negative electrode material.

18 Claims, 1 Drawing Sheet

U.S. PATENT DOCUMENTS

| | | |
|---|---|---|
| 1,903,705 | 4/1933 | Nikaido . |
| 3,961,025 | 6/1976 | Harendza-Harinxma . |
| 4,318,710 | 3/1982 | Pilipski . |
| 5,153,082 | 10/1992 | Ogino et al. . |
| 5,169,736 | 12/1992 | Bittihn et al. . |
| 5,238,760 | 8/1993 | Takahashi et al. ........................ 429/194 |
| 5,580,538 | 12/1996 | Bito et al. ............................. 423/447.4 |
| 5,834,138 | 11/1998 | Yamada et al. ......................... 429/194 |

FOREIGN PATENT DOCUMENTS

| | | |
|---|---|---|
| 0 700 105 A2 | 3/1996 | European Pat. Off. . |
| 63-58775 | 3/1988 | Japan ........................... H01M 10/40 |
| 4-39862 | 2/1992 | Japan . |
| 4-308670 | 10/1992 | Japan ........................... H01M 10/40 |

OTHER PUBLICATIONS

Application as a Negative Electrode for a Lithium Ion (Shuttlecock) Cell, Journal of the Electrochemical Society, vol. 140, No. 9, Sep. 1, 1993, pp. 2490–2498, XP 000424105.

Patent Abstracts of Japan, vol. 014, No. 222 (E–0926), May 10, 1990 & JP 02054866 A (Mitsubishi Petrochem Co Ltd;Others: 01), Feb. 23, 1990.

NEGATIVE ELECTRODE MATERIAL FOR NON-AQUEOUS LIQUID ELECTROLYTE SECONDARY CELL, METHOD FOR PRODUCING SAME AND NON-AQUEOUS LIQUID ELECTROLYTE SECONDARY CELL EMPLOYING SAME

This application is a divisional of prior application Ser. No. 08/737,285, filed Nov. 6, 1996, now U.S. Pat. No. 5,834,138 which is a 371 National Stage application of PCT/JP/00548 Mar. 6, 1996.

TECHNICAL FIELD

This invention relates to a negative electrode material used in a non-aqueous liquid electrolyte secondary cell. More particularly, it relates to a negative electrode material of a carbonaceous material capable of doping and dedoping lithium ions. The invention also relates to a method for producing the material and a non-aqueous liquid electrolyte secondary cell employing the material.

BACKGROUND ART

With recent progress in electronics, a small-sized portable electronic equipment, such as a camera-integrated VTR, portable telephone or a lap-top computer, has been developed, and a strong demand has been raised for development of a small-sized and lightweight secondary cell with high energy density as a portable power source used for the equipment.

Of the secondary cells, satisfying this demand, a non-aqueous liquid electrolyte secondary cell of a high energy density, which is capable of generating a theoretically high voltage and which employs light metals, such as lithium, sodium or aluminum as an active material for the negative electrode, is most promising. In particular, the non-aqueous liquid electrolyte secondary cell in which lithium ion charging/discharging is done via a non-aqueous liquid electrolyte, is thought to be able to develop high output and high energy density as compared to the aqueous solution based liquid electrolyte secondary cell, such as nickel/cadmium cell or a lead storage cell. For this reason, investigations in this type of the non-aqueous liquid electrolyte secondary cell are proceeding briskly.

If, in such non-aqueous liquid electrolyte secondary cell, light metals, such as lithium metal, are simply used as they are as the negative electrode material, lithium metals tend to be precipitated in a dendritic form in the negative electrode during charging. Since the current density becomes exceedingly high at the distal end of the dendrite, the cycle life is shortened due to decomposition of the liquid electrolyte. If the dendrite is grown excessively, internal shorting in the cell is likely to be produced. For assuring the operating time of the small-sized electronic equipment and the service life of power source packages, it has been strongly desired to develop a negative electrode material capable of realizing a high energy density cell.

With this in view, for prohibiting precipitation of, for example, dendritic metals, such as metal lithium, for improving cyclic charging/discharging characteristics of the cell, it has been proposed to use a carbonaceous material capable of doping and dedoping lithium ions as the active materials for the negative electrode as a material for a negative electrode for a non-aqueous liquid electrolyte secondary cell (JP Patent Kokai Publication JP-A-62-90863).

It is believed that, theoretically, lithium ions are electrochemically doped and dedoped in an interlayer space of the graphite-like layered structure of the carbonaceous material at a rate of one lithium atom per six carbon atoms. For such carbonaceous materials, cokes (such as pitch coke, needle coke or petroleum coke) or sintered organic high molecular compounds, such as furan resins or natural high molecular materials sintered and carbonized at a suitable temperature, as disclosed in JP-Patent Kokai Publication JP-A-4-308670, are mainly used in view of production cost ad cyclic charging/discharging characteristics.

Of these carbonaceous materials, those produced by sintering crystalline cellulose, which is a natural high molecular material susceptible to fluctuations in the polymerization degree and hence in the properties of the sintered product to a lesser extent than synthetic high molecular material (JP-Patent Kokai publication JP-A-2-54866) is drawing the notice. This carbonaceous material is thought to be promising as a material of a negative electrode of a non-aqueous liquid electrolyte secondary cell in that it has a high charging capacity as compared to cokes. In distinction from a synthetic high molecular material prepared from fossil resources, cellulose is a regeneratable raw material and its re-utilization is thought to be desirable from the viewpoint of maintenance and improvement of earth environment.

However, the crystalline cellulose based carbonaceous material, while having a higher charging capacity, undesirable has a low charging/discharging efficiency which is a ratio of the discharging capacity to charging capacity. Consequently, for producing a practically useful cell using the crystalline cellulose based carbonaceous material as a negative electrode material, it becomes necessary to use an active material for a positive electrode, such as oxides of lithium transition metals, in an amount that matches the charging capacity instead of the discharging capacity of the negative electrode, so that a considerably excess amount of the active material for the positive electrode as compared to the discharging capacity is used. Therefore, using the crystalline cellulose based carbonaceous material of low charging/discharging capacity as a material of a negative electrode of a non-aqueous liquid electrolyte secondary cell is not desirable in producing a high energy density cell under conditions of limited volume and weight.

It has also been demanded to proceed further from using a vegetable high molecular material, such as regeneratable crystalline cellulose as a raw material for the carbonaceous material for a negative electrode of a non-aqueous liquid electrolyte secondary cell, and to re-utilize the used waste material thereof as a regenerated material.

It has also been demanded that not only the carbonaceous material derived from plant high molecular material but also generic carbonaceous negative electrode material be able to achieve a high charging/discharging capacity as a material of a negative electrode of a non-aqueous liquid electrolyte secondary cell.

DISCLOSURE OF THE INVENTION

It is an object of the present invention to provide a negative electrode material prepared for a raw material that is regeneratable and can be produced from an industrial waste material and to produce a negative electrode of a non-aqueous liquid electrolyte secondary cell using the above negative electrode material for realizing a high charging/discharging capacity and a high charging/discharging efficiency.

It is another object to achieve a high charging/discharging capacity when a negative electrode of a non-aqueous liquid electrolyte secondary cell is prepared not only when a material carbonized from a specified raw material but also a generic carbonaceous negative electrode material is used for producing a negative electrode of a non-aqueous liquid electrolyte secondary cell.

As a result of perseverant researches, the present inventor has found that, by using a negative electrode prepared by sintering and carbonizing a specified plant origin high molecular material available as an industrial waste material, a high charging/discharging capacity can be achieved in a non-aqueous liquid electrolyte secondary cell.

The present inventor has also found that such specified plant high molecular material, thus sintered and carbonized, contains metal elements, element phosphorus and element sulphur in higher proportions than the carbonaceous material derived from crystalline cellulose and consequently a high charging/discharging efficiency can be achieved in the non-aqueous liquid electrolyte secondary cell by using a negative electrode material formed of a co-carbonized material of the compound containing the above elements and the high molecular plant-origin material.

The present inventor has also found that a material obtained on sintering and carbonizing a specified plant-origin high-molecular material has a peak in a specified range of 2θ diffraction angle of an X-ray diffraction pattern, such peak being not observed in the case of a carbonaceous material derived from a high parity crystalline cellulose, and that not only the material obtained on sintering and carbonizing the specified plant-origin high-molecular material, but also the carbonaceous material having such peak, can achieve high charging/discharging capacity in the non-aqueous liquid electrolyte secondary cell as compared to the carbonaceous material not having such peak. The above information has led to completion of the present invention.

A first embodiment of a negative electrode material for a non-aqueous liquid electrolyte secondary cell according to the present invention resides in that it contains at least one carbonaceous material selected from the group consisting of coffee beans, tea leaves, cane sugar, corns, fruits, straws of cereals and husks of cereals.

A second embodiment of a negative electrode material for a negative electrode material for a non-aqueous liquid electrolyte secondary cell according to the present invention resides in that it contains a carbonaceous material derived from a plant-origin high molecular material containing a sum total of 0.2 to 20 wt % of metal elements, phosphorus and sulphur calculated as elements.

If, in connection with the second embodiment, the amounts of the metal elements, phosphorus and sulphur are scrutinized independently, a third embodiment of the present invention resides in a negative electrode material for a non-aqueous liquid electrolyte secondary cell characterized in that it contains a carbonaceous material derived from a plant-origin high molecular material containing 0.01 to 0.5 wt % of Na calculated as element;

a negative electrode material for a non-aqueous liquid electrolyte secondary cell characterized in that it contains a carbonaceous material derived from a plant-origin high molecular material containing 0.01 to 3 wt % of K calculated as element;

a negative electrode material for a non-aqueous liquid electrolyte secondary cell characterized in that it contains a carbonaceous material derived from a plant-origin high molecular material containing 0.05 to 20 wt % of Ca calculated as element;

a negative electrode material for a non-aqueous liquid electrolyte secondary cell characterized in that it contains a carbonaceous material derived from a plant-origin high molecular material containing 0.02 to 1 wt % of Mg calculated as element;

a negative electrode material for a non-aqueous liquid electrolyte secondary cell characterized in that it contains a carbonaceous material derived from a plant-origin high molecular material containing 0.005 to 0.5 wt % of Al calculated as element;

a negative electrode material for a non-aqueous liquid electrolyte secondary cell characterized in that it contains a carbonaceous material derived from a plant-origin high molecular material containing 0.04 to 3 wt % of phosphorus calculated as element;

a negative electrode material for a non-aqueous liquid electrolyte secondary cell characterized in that it contains a carbonaceous material derived from a plant-origin high molecular material containing 0.03 to 0.5 wt % of sulphur calculated as element; and a negative electrode material for a non-aqueous liquid electrolyte secondary cell characterized in that it contains a carbonaceous material derived from a plant-origin high molecular material containing 0.01 to 1 wt % of Si calculated as element.

The conditions of the second and third embodiments may be taken into account independently. That is, it is only sufficient if one of the conditions, that is the sum total of the amounts of the respective elements and the amounts of the respective elements, is met. Of course, two or more of the conditions may be met.

A fourth embodiment of a negative electrode material for a non-aqueous liquid electrolyte secondary cell according to the present invention resides in that it contains a carbonaceous material having a diffraction peak between 30° and 32° of the 2θ diffraction angle in the X-ray (CuKα) powder diffraction pattern.

The negative electrodes of the above-described first to fourth embodiments are highly suitable for a non-aqueous liquid electrolyte secondary cell. In particular, the negative electrode materials of the first to fourth embodiments are highly suitable for a non-aqueous liquid electrolyte secondary cell having a positive electrode formed of a lithium compound oxide and a negative electrode formed of a carbonaceous negative electrode material capable of doping and dedoping lithium ions as an active negative electrode material.

BEST MODE FOR CARRYING OUT THE INVENTION

Figure 1:
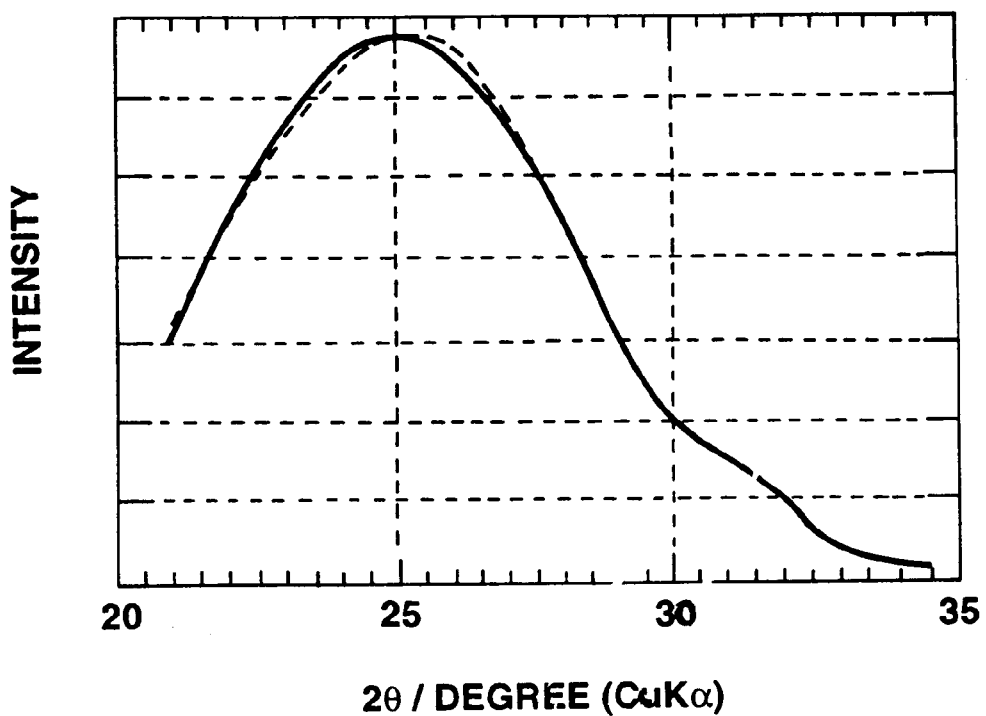
FIG. 1 is a graph showing a corrected X-ray (CuKα) diffraction pattern of a negative electrode material of an Example F1.

The present invention will be explained beginning from a material of a negative electrode of a non-aqueous liquid electrolyte secondary cell according to a first embodiment.

The material of a negative electrode of a non-aqueous liquid electrolyte secondary cell according to the first embodiment is characterized in that it contains at least one carbonized material selected from the group consisting of coffee beans, tea leaves, sugar cane, corn, fruits, straws of cereals, or husks of cereals. it is possible with these carbonized materials to achieve a high charging/discharging efficiency as compared to the carbonaceous material derived from pure crystalline cellulose.

Although the reason therefor is not apparent, the present inventor contemplates as follows: That is, in distinction from filter paper formed of substantially pure crystalline cellulose with a molecular weight of the order of 200,000, the coffee beans, tea leaves, sugar cane, corn, fruits, straws of cereals, or husks of cereals contain a larger amount of components other than such cellulose. For example, coffee or tea leaves contain hemicellulose with a molecular weight on the order of 20,000, low molecular weight caffeine or organic acids, while sugar cane or corn contains starch or sugar. The fruits contain hemicellulose, vitamins and minerals, while straws or husks of cereals contain metals, phosphorus or sulphur. It is contemplated that, if the raw material having such composition is carbonized, there is formed a matrix derived from crystalline cellulose and a structural or porous portion derived from other components, such as hemicellulose, starch or extraneous elements are intricately entangled with the matrix thus forming a low-crystalline structure. It may be presumed that the number of doping sites for light metal ions present in inter-layer portions of the graphite-like layered structure, such as lithium ions, is increased, while the number of sites that cannot be dedoped is decreased. Therefore, the negative electrode material of the first embodiment is useful as a negative electrode that can dope and dedope light metal ions operating as an active material of a negative electrode of a non-aqueous liquid electrolyte secondary cell, such as lithium ions.

The material of a negative electrode of a non-aqueous liquid electrolyte secondary cell is produced by sintering and carbonizing at least one selected from the group consisting of coffee beans, tea leaves, sugar cane, corn, fruits, straws of cereals, or husks of cereals. The carbonizing conditions, such as temperature raising rate, ultimate temperature (sintering temperature) or cooling conditions can be set appropriately. For example, sintering may be by previously carbonizing in vacuum or in an inert gas atmosphere, such as in nitrogen or argon atmosphere, at 300 to 800° C., preferably 400 to 700° C., subsequently raising the temperature in vacuum or in an inert gas atmosphere, such as in nitrogen or argon atmosphere, at a temperature raising rate of not less than 1° C./min, preferably not less than 3° C./min and more preferably not less than 5° C./min, up to a temperature of 700 to 3000° C., preferably 800 to 2000° C. and more preferably 90 to 1500° C. and maintaining the temperature for 0 to 10 hours, preferably for 0 to 7 hours and more preferably for 0 to 5 hours.

There is no particular limitation to the sorts or forms of the coffee beans, tea leaves, such as leaves of green tea or black tea, cane sugar, corns or fruits, such as oranges or bananas, and may be raw or processed such as by drying, fermentation, pulverization, baking or extraction. In particular, from the viewpoint of utilizing the industrial wastes as resources, used-up coffee beans, tea leaves, squeezed cane sugar, corn kernels, oranges or banana husks may preferably be used. These may be produced easily and in larger quantities from a food processing companies.

The cereals of which the straws or husks are used are not placed under limitation and straws or husks of rice, wheat, wheat, ryes, barnyard millet or millet may be used. There is no limitation to the shape or from of the straws or husks such that raw or dried the straws or husks may be used. Those processed in many ways, such as by fermentation, baking or extraction in food or beverage processing, such as beer or foreign liquors, may also be used. In particular, the straws or husks obtained after threshing are preferably used for utilizing the industrial wastes as resources. The processed straws or husks may be easily obtained in larger quantities from the liquor producer or food companies.

The second embodiment of the present invention is now explained.

The material of a negative electrode of a non-aqueous liquid electrolyte secondary cell according to the second embodiment is characterized in that it is composed of a carbonaceous material derived from a plant-origin high molecular material containing a sum total of 0.2 to 20 wt %, preferably 0.5 to 10 wt % and more preferably 1.0 to 5.0 wt % of metal elements, phosphorus and sulphur calculated as elements, Such carbonized material can achieve a higher charging/discharging efficiency than is possible with the carbonaceous material derived from pure crystalline cellulose.

Although the reason therefor is not apparent, it may be contemplated that, by containing at least one of metal elements, phosphorus and sulphur, the carbonaceous material is lowered in crystallinity and the number of doping sites for light metal ions present in inter-layer portions of the graphite-like layered structure, such as lithium ions, is increased, while the number of sites that cannot be dedoped is decreased. Therefore, the negative electrode material of the second embodiment is useful as a negative electrode that can dope and dedope light metal ions operating as an active material of a negative electrode of a non-aqueous liquid electrolyte secondary cell, such as lithium ions.

If the content of metals, phosphorus and sulphur is less than 0.2 wt %, calculated as elements, the charging/discharging efficiency cannot be expected to be increased. If the content exceeds 20 wt %, crystallinity becomes too low and hence moldability is undesirably lowered.

Examples of the metal elements may be enumerated by Na, K, Ca, Mg, Al and Si.

The material of a negative electrode of a non-aqueous liquid electrolyte secondary cell may be produced by sintering and carbonizing a plant-origin high molecular material, containing at least one of metal ions, phosphorus and sulphur, in the same way as for producing material of a negative electrode of a non-aqueous liquid electrolyte secondary cell of the first embodiment of the present invention.

As the plant-origin high molecular material, substantially pure crystalline cellulose may be employed, however, he plant-origin high molecular material containing metal containing vitamins, phosphorus compounds or sulphur compounds in the spontaneous growing state may preferably be employed. In particular, at least one carbonaceous material selected from coffee beans, tea leaves, sugar cane, corn, fruits, straws of cereals, or husks of cereals may preferably be used in view of re-utilization of the waste materials as resources and for increasing the charging/discharging efficiency.

If crystalline cellulose is used as the plant-origin high molecular material, or if the content of particular elements is increased, various metals, phosphorus or sulphur are added ti the plant-origin high molecular material as they are or in the form of hydroxides, oxides, inorganic salts, such as carbonates or phosphates, or organic salts, such as carboxylates. For adding these compounds to be plant-origin high molecular materials, powders may be directly admixed to the plant-origin high molecular materials, or added and mixed to the plant-origin high molecular material as a solvent dissolved in a suitable solvent. The addition may be made before or after preliminary carbonization.

A third embodiment of the present invention is now explained.

In the above-described second embodiment, the present invention has been grasped from the viewpoint of the total content of metals, phosphorus and sulphur. In the third embodiment of the material of a negative electrode of a non-aqueous liquid electrolyte secondary cell, the present invention is grasped from the viewpoint of the content of each element.

As for the amounts of the various elements in the carbonaceous material derived from the carbonaceous material plant origin high molecular material, the amount of Na is 0.01 to 0.5 wt %, that of K is 0.01 to 3 wt %, that of Ca is 0.05 to 20 wt %, that of Mg is 0.02 to 1 wt %, that of Al is 0.005 to 0.5 wt %, that of phosphorus is 0.04 to 3 wt %, that of sulphur id 0.03 to 0.5 wt % and that of Si is 0.01 to 1 wt %. At least one of these conditions should be met.

As compared to the carbonaceous material derived from the pure crystalline cellulose, the above-defined carbonaceous material is capable of achieving a high charging/discharging efficiency. Although the reason therefor is not apparent, it may be contemplated that, by the content of at least one of the above-mentioned elements in the specified range, the carbonaceous material is lowered in crystallinity and the number of doping sites for light metal ions present in inter-layer portions of the graphite-like layered structure, such as lithium ions, is increased, while the number of sites that cannot be dedoped is decreased. Therefore, the negative electrode material of the first embodiment is useful as a negative electrode that can dope and dedope light metal ions operating as an active material of a negative electrode of a non-aqueous liquid electrolyte secondary cell, such as lithium ions.

The material of a negative electrode of a non-aqueous liquid electrolyte secondary cell according to the third embodiment can be produced by sintering and carbonizing a plant-based high-molecular material containing Na, K, Ca, Mg, Al, phosphorus, sulphur or Si in the same way as when producing the material of a negative electrode of a non-aqueous liquid electrolyte secondary cell of the first embodiment of the present invention.

As the plant-based high molecular materials, the plant-based high molecular material similar to that explained in connection with the second embodiment of the material of a negative electrode of a non-aqueous liquid electrolyte secondary cell may be used. This achieves higher charging/discharging capacity.

A fourth embodiment of the present invention will be explained.

The fourth embodiment of the material of a negative electrode of a non-aqueous liquid electrolyte secondary cell grasps the present invention from the viewpoint of X-rat (CuKα) powder diffraction pattern characteristics. In this case, the carbonaceous material being considered is not limited to that derived from the plant-based high molecular material, but may encompass generic carbonaceous materials, such as synthetic high polymers. With such carbonaceous material, as compared to the crystalline cellulose based carbonaceous material not exhibiting the diffraction peaks, a high charging/discharging capacity may be achieved. Although the reason therefor is not apparent, it may be contemplated from the fact that crystalline cellulose fails to exhibit the diffraction peak that, if the carbonaceous material is lowered in crystallinity, the number of doping sites for light metal ions present in inter-layer portions of the graphite-like layered structure, such as lithium ions, is increased, while the number of sites that cannot be dedoped is decreased. Therefore, the negative electrode having such diffraction peak is thought to improve the charging/discharging capacity of the non-aqueous liquid electrolyte secondary cell. Therefore, the negative electrode material of the fourth embodiment is useful as a negative electrode that can dope and dedope light metal ions operating as an active material of a negative electrode of a non-aqueous liquid electrolyte secondary cell, such as lithium ions.

Meanwhile, such carbonaceous material having diffraction peaks between 30° and 32° of the 2θ diffraction angle that the diffraction peak intensity between 30° and 32° of the 2θ diffraction angle in the corrected X-ray (CuKα) powder diffraction pattern intensity is not less than 2% of the (002) diffraction peak intensity, is particularly preferred. It is noted that the correction of the X-ray powder diffraction pattern is the diffraction pattern intensity I(θ) corrected by the squares of the polarization factor, absorption factor and the atomic scattering factor (which is a function of sinθ/λ but for which a coefficient of an analytic approximate equation on the carbon atom not in the valence state is used):

$$\text{polarization factor} = \frac{1 + \cos^2(2*\theta) * \cos^2(2*\alpha)}{1 + \cos^2(2*\alpha)}$$

$$\left[\text{for } 0 < t < \frac{A}{2} * \csc\theta\right]$$

$$\text{absorption coefficient} = \left(\sec\theta - \frac{t}{A} * \tan\theta\right) * \exp(-\mu * t * (\sec\theta - 1))$$

$$\left[\text{for } t \geq \frac{A}{2} * \csc 2\theta\right]$$

$$\text{absorption coefficient} = \frac{A}{2t} * \csc 2\theta * \exp(-\mu * t * (\sec\theta - 1))$$

$$\text{atomic scattering factor: } f(\sin\theta/\lambda) = \sum_{i=1}^{4} a_i * \exp(-b_i * (\sin^2\theta/\lambda^2)) + c$$

The intensity I(θ) is arbitrary and may be the number of counts per second or simply the number of counts.

In the above equations, θ is the angle of diffraction, A is the width the X-rays impinges on the sample surface (=L*sin β, where L is the distance from an X-ray source to the sample and β is a scattering slit width), t is a sample thickness, μ is a line absorption coefficient of a sample which is equal to the product of a mass absorption coefficient of a sample (4.17) with the specific gravity), and α is one-half the diffraction angle of a monochrometer. If a CuKα ray and a graphite monochrometer, for example, are used, α is 13.3° which is one-half the (002) diffraction angle of graphite.

Although the material of a negative electrode of a non-aqueous liquid electrolyte secondary cell of a fourth embodiment may be a difficultly graphatizable carbon material or an easily graphatizable carbon material, the former is preferred in view of an increased volume. The difficultly graphatizable carbon material usually means a carbonaceous material which is not graphatized readily even after high-temperature heat treatment at elevated temperature of the order of 3000° C. In the present invention, it means such a carbonaceous material having a d (002) value of not less than 0.34 nm after heat treatment at 2600° C.

The material of a negative electrode of a non-aqueous liquid electrolyte secondary cell according to the fourth embodiment can be prepared by sintering and carbonizing various carbon precursors in the same way as when preparing a material of a negative electrode of a non-aqueous liquid electrolyte secondary cell according to the first embodiment of the present invention.

These carbon precursors may be enumerated by a natural organic substance, such as an organism of a living organism or petroleum pitch, or a synthetic organic material industrially produced from a natural organic matter, such as petroleum. The tissue of the living organism may be enumerated by coffee beans, tea leaves, sugar cane, corn, fruits, straws of cereals, or husks of cereals. The petroleum pitch may be enumerated by such product as is produced by distillation (vacuum distillation, ambient pressure distillation or steam distillation), thermal polycondensation, extraction or chemical polycondensation of asphalt or tars obtained on high-temperature heat cracking of coal tar, ethylene bottoms or crude oil. As the synthetic organic materials, any arbitrary organic high polymer materials, such as furan resins, acrylic resins, halogenated vinyl resins, halogenated vinylidene resins, polyimide resins, polyamide resins, conjugate resins, such as polyacetylene or poly-p-phenylene, or cellulose resins, may be used. In addition, condensed polycyclic hydrocarbon compounds, such as naphthalene, phenanthrene, anthracene, triphenylene, pyrene, perylene, pentaphene or pantacene and derivatives thereof, such as carboxylic acid, carboxylic anhydrides, carboxylic imide derivatives), various pitches mainly composed of the mixtures of various compounds, or condensed heterocyclic compounds, such as acenaphthylene, indole, isoindole, quinoline, quinoxaline, phthalazine, carbazole, acridine phenazine or phenanhridine, or derivatives thereof, may be employed.

If need be, oxygen-containing functional groups may be introduced into the pitch derived from petroleum pitch or organic materials. These functional groups may be introduced by known techniques, such as by a wet method employing aqueous solutions of nitric acid, mixed acids, sulfuric acid or hypochlorous acid, or by a dry method employing oxidizing gases, such as air of oxygen. Dehydorogenating agents, such as chlorine compounds, including ferric chloride or zinc chloride, sulphur, ammonia nitrate or ammonia oersulfate, may be added, if need be. Two or more of the above-mentioned precursors of the carbonaceous materials may be used in combination, or the carbonaceous materials, such as carbon fibers, may be used in conjunction with the precursors of the carbonaceous materials.

The negative electrode materials of the fourth embodiment is required to have specified diffraction peak, so that it is necessary to select and use the above-mentioned sintered precursors of the carbonaceous materials having the above-mentioned diffraction peak.

The negative electrode materials according to the first to fourth embodiments are preferably employed as conventionally as the negative electrode materials for a non-aqueous liquid electrolyte secondary cell. In particular, the negative electrode materials are preferably used as the negative electrode of the non-aqueous liquid electrolyte secondary cell having a positive electrode formed of a lithium compound oxide and a negative electrode formed of a carbonaceous electrode material capable of doping and dedoping lithium ions as an active negative electrode material. In particular, the negative electrode suitable for a cell, in particular a non-aqueous liquid electrolyte secondary cell, may be prepared by pulverizing negative electrode materials of the first to fourth embodiments, heating the resulting powders at about 600° C. if need be for removing surface adsorbed water, mixing the resulting powders with a binder, such as polyvinylidene fluoride and a solvent, such as dimethylamide to prepare a paste-like mixture and coating the resulting mixture on a current collector. The non-aqueous liquid electrolyte secondary cell, having the negative electrode, thus produced, is improved in charging/discharging capacity and charging/discharging efficiency.

The positive electrode constituting the non-aqueous liquid electrolyte secondary cell may be formed by employing metal oxides, metal sulfides or specified polymers as active material depending on the sorts of the cell to be produced. For producing a non-aqueous liquid electrolyte lithium ion secondary cell, metal sulfides or oxides not containing lithium, such is $TiO_2$, $MoS_2$, $NbSe_2$ or $V_2O_5$, may be used as a positive electrode active material. For producing a cell of high energy density, it is desirable to employ a lithium composite oxide mainly composed of $Li_xMO_2$, where M denotes one or more transition metals, with $0.05 \leq X \leq 1.10$. As the transition metals M making up the lithium compound oxide, Co, Ni or Mn is preferred. Examples of the lithium compound oxides include $LiCoO_2$, $LiNiO_2$ and $Li_xNi_yCo_{1-y}O_2$, where x, y differ with the charging/discharging state of the cell and usually $0<x<1$ and $0.7<y<1.2$, and $LiMn_2O_4$. These lithium compound oxides may be prepared by pulverizing and mixing carbonates, nitrates, oxides or hydroxides of lithium with carbonates, nitrates, oxides or hydroxides of cobalt, manganese or nickel in desired proportions and sintering the resulting mixture in an oxygen atmosphere in a temperature range from 600° C. to 1,000° C.

The non-aqueous solvents constituting the non-aqueous liquid electrolyte secondary cell may be propylene carbonate, ethylene carbonate, diethyl carbonate, methyl ethyl carbonate, 1,2-dimethoxyethane, 1,2-diethoxyethane, γ-butyrolactone, tetrahydrofuran, 1,3-dioxolane, dipropyl carbonate, diethylether, sulforane, acetonitrile, propylnitrile, anisole, ester of acetic acid or esters of propionic acid. Two or more of these compounds may be used in combination.

As the electrolytes dissolved in non-aqueous electrolytes, salts of light metals, such as lithium, sodium or aluminum may be employed. These electrolytes may be selected suitably depending on the sorts of the cells employing the non-aqueous liquid electrolytes. For constituting the non-aqueous liquid electrolyte secondary cell, lithium salts, such as $LiClO_4$, $LiAsF_6$, $LiPF_6$, $LiBF_4$, $LiCF_3SO_3$, $LiN(CF_3SO_2)_2$, may be employed as the electrolyte.

As described above, by employing the material of a negative electrode of a non-aqueous liquid electrolyte secondary cell of the present invention in the non-aqueous liquid electrolyte secondary cell having the positive electrode formed of a lithium composite oxide and a negative electrode formed of a carbonaceous material capable of doping and dedoping lithium ions, it becomes possible to provide a non-aqueous liquid electrolyte lithium ion secondary cell having high energy density, high charging/discharging capacity and high charging/discharging efficiency.

There is no particular limitation to the shape of the non-aqueous liquid electrolyte secondary cell which may be cylindrical, square, coin-shaped or button-shaped. If the cell is of the hermetically sealed type, a protection device may be provided for breaking the current with rise in pressure in the cell during failure such as excessive charging/discharging for assuring higher safety.

The present invention will be explained with reference to more illustrative embodiments.

EXAMPLE A1

The coffee beans, washed with lukewarm water, was carbonized by hating at 500° C. for five hours in a nitrogen stream. The resulting carbonized product was pulverized and 10 g of the resulting powders were charged into an alumina crucible and heated in a nitrogen stream of 1000 liters/ minute at a temperature rising rate of 5° C./minute up to an ultimate temperature of 1100° C. This temperature was maintained for one hour for sintering the material to a carbonized product. This produced a negative carbonaceous electrode material for a non-aqueous liquid electrolyte secondary cell.

EXAMPLE A2

A material of a negative electrode of a non-aqueous liquid electrolyte secondary cell was produced in the same way as in Example A1 except using an ultimate temperature of 1200° C.

EXAMPLE A3

A material of a negative electrode of a non-aqueous liquid electrolyte secondary cell was produced in the same way as in Example A1 except using leaves of green tea sufficiently washed with lukewarm water in place of coffee beans.

EXAMPLE A4

A material of a negative electrode of a non-aqueous liquid electrolyte secondary cell was produced in the same way as in Example A3 except using an ultimate temperature of 1200° C.

Comparative Example a1

A material of a negative electrode of a carbonaceous material was produced in the same way as in Example A1 except using crystalline cellulose (manufactured by WAKO PURE CHEMICALS CO.LTD.) in place of coffee beans.

Comparative Example a2

A material of a negative electrode of a carbonaceous material was produced in the same way as in Example A1 except using he ultimate temperature of 1200° C.

Evaluation

Using the negative carbonaceous electrode material obtained in Examples A1 to A4 and Comparative Examples a1 to a2, test cells were prepared as now explained for conducting negative electrode capacity tests.

Preparation of Test Cells

The respective negative carbonaceous electrode materials were pulverized in a mortar and classified in a mesh sieve for collecting powders with a diameter not larger than 38 $\mu$m. These powders were heated in an argon atmosphere at a temperature rising rate of 30 minute to an ultimate temperature of 600° C. which was maintained for one hour. This removed water adsorbed on the surface of the powders.

These powders were cooled to room temperature. After cooling, 90 parts by weight of the powders and 10 parts by weight of polyvinilydene fluoride (PVDF) as a binder and dimethyl formamide as a solvent were homogeneously mixed and dried to give a negative electrode mixture.

37 mg of the negative electrode mixture and a nickel mesh as a current collector with a nickel fiber diameter of 20 $\mu$m were used to prepare a pelle-t 15.5 mm in diameter as to conventionally prepare a carbon electrode.

Using the carbon electrode as a negative electrode, a coin-shaped test cell having a diameter of 20 mm and a thickness of 25 mm was prepared. The cell was made up of a counter electrode/Li metal; separator/porous film formed of polypropylene; liquid electrolyte/solution obtained on dissolving $LiClO_4$ in a propylene carbonate dimethoxy ethane mixed solvent by 1:1 volume ratio at a ratio of 1 mol per liter; current collector/copper foil.

Negative Electrode Capacity Test

With the test cell, the following charging/discharging was carried out with the constant current of 1 mA (current density of 0.53 $mA/cm^2$). Meanwhile, the charging/discharging capacity (negative electrode) is based on the equilibrium potential as a reference thus reflecting characteristics proper to the material. The results obtained are shown in Table 1.

Charging: Current supply for one hour and current interruption for two hours were recreated. By plotting the electrical voltage as shown with respect to minus 0.5 power of the current interruption time and extrapolation to infinite time, the equilibrium potential was estimated by the charging capacity (current supply/current interruption charging/discharging method).

The charging was discontinued when the equilibrium potential was 3 mV with respect to lithium.

Discharging: Current supply for one hour and current interruption for two hours were recreated. Discharging was terminated at a time point when the test cell voltage in the current conducting state was lower than 1.5 V. The discharging capacity was divided by the carbon weight in the negative electrode to give a charging/discharging capacity of the negative electrode.

TABLE 1

|  | raw materials used | sintering temperature (° C.) | negative electrode capacity (mAh/g) | volumetric increasing ratio (%) |
| --- | --- | --- | --- | --- |
| Ex. A1 | coffee beans | 1100 | 488 | 47 (to Comp. Ex. a1) |
| Ex. A2 | coffee beans | 1200 | 407 | 32 (to Comp. Ex. a2) |
| Ex. A3 | green tea leaves | 1100 | 412 | 24 (to Comp. Ex. a1) |
| Ex. A4 | green tea leaves | 1200 | 368 | 19 (to Comp. Ex. a2) |
| Comp. Ex. a1 | cryst. cellulose | 1100 | 332 | — |
| Comp. Ex. a2 | cryst. cellulose | 1200 | 308 | — |

It is seen from Table 1 that the negative electrode materials of Examples A1 to A4, prepared using the coffee beans or green tea leaves as raw materials exhibited a high load capacity as compared to the negative electrode materials of Comparative Examples a1 and a2 obtained by sintering crystalline cellulose at the same temperature.

EXAMPLE B1

The cane sugar, washed with lukewarm water, was heated in a nitrogen stream at 500° C. for 5 hours. The carbonized product was pulverized to powders, 10 g of which were charged into an alumina crucible and heated in a nitrogen stream of 10 liters/min at a temperature rising rate of 5° C./min to 1100° C. (ultimate temperature) which was maintained for one hour for sintering and carbonization. This gave a negative electrode carbonaceous material for a non-aqueous liquid electrolyte secondary cell.

EXAMPLE B2

The negative electrode carbonaceous material for a non-aqueous liquid electrolyte secondary cell was produced in the same way as in Example B1 except setting the ultimate temperature to 1200° C.

EXAMPLE B3

The negative electrode carbonaceous material for a non-aqueous liquid electrolyte secondary cell was produced in the same way as in Example B2 except using corn washed with lukewarm water in place of the sugar cane.

EXAMPLE B4

The negative electrode carbonaceous material for a non-aqueous liquid electrolyte secondary cell was produced in the same way as in Example B3 except setting the ultimate temperature to 1300° C.

Comparative Example b1

The negative electrode carbonaceous material for comparison was produced in the same way as in Example B1 except using crystalline cellulose (manufactured by WAKO PURE CHEMICALS CO. LTD.) in place of the sugar cane.

Comparative Example b2

The negative electrode carbonaceous material for a non-aqueous liquid electrolyte secondary cell was produced in the same way as in Comparative Example b1 except setting the ultimate temperature to 1200° C.

Comparative Example b3

The negative electrode carbonaceous material for a non-aqueous liquid electrolyte secondary cell was produced in the same way as in Comparative Example b1 except setting the ultimate temperature to 1300° C.

Evaluation Using the negative carbonaceous electrode material obtained in Examples B1 to B4 and Comparative Examples b1 to b3, test cells were prepared in the same way for conducting negative electrode capacity tests. The results are shown in Table 2.

TABLE 2

|  | raw materials used | sintering temperature (° C.) | negative electrode capacity (mAh/g) | volumetric increasing ratio (%) |
| --- | --- | --- | --- | --- |
| Ex. B1 | cane sugar | 1100 | 425 | 28 (to Comp. Ex. b1) |
| Ex. B2 | cane sugar | 1200 | 387 | 26 (to Comp. Ex. b2) |
| Ex. B3 | corn | 1200 | 434 | 41 (to Comp. Ex. b1) |
| Ex. B4 | corn | 1300 | 441 | 53 (to Comp. Ex. b3) |
| Comp. Ex. b1 | cryst. cellulose | 1100 | 332 | — |
| Comp. Ex. b2 | cryst. cellulose | 1200 | 308 | — |
| Comp. Ex. b3 | cryst. cellulose | 1300 | 289 | — |

It is seen from Table 2 that the negative electrode materials of Examples B1 to B4, prepared using the coffee beans or green tea leaves as raw materials exhibited a high load capacity as compared to the negative electrode materials of Comparative Examples obtained by sintering crystalline cellulose at the same temperature.

EXAMPLE C1

The skin of an orange, sufficiently washed with lukewarm water and ethanol, was heated in a nitrogen stream at 500° C. for 5 hours. The carbonized product was pulverized to powders, 10 g of which were charged into an alumina crucible and heated in a nitrogen stream of 10 liters/min at a temperature rising rate of 5° C./min to 1100° C. (ultimate temperature) which was maintained for one hour for sintering end carbonization. This gave a negative electrode carbonaceous material for a non-aqueous liquid electrolyte secondary cell.

EXAMPLE C2

The negative electrode carbonaceous material for a non-aqueous liquid electrolyte secondary cell was produced in the same way as in Example C1 except setting the ultimate temperature to 1200° C.

EXAMPLE C3

The negative electrode carbonaceous material for a non-aqueous liquid electrolyte secondary cell was produced in the same way as in Example C1 except using the skin of a banana washed sufficiently with lukewarm water and ethanol in place of the skin of an orange.

EXAMPLE C3

The negative electrode carbonaceous material for a non-aqueous liquid electrolyte secondary cell was produced in the same way as in Example C1 except setting the ultimate temperature to 1200° C.

EXAMPLE C4

The negative electrode carbonaceous material for a non-aqueous liquid electrolyte secondary cell was produced in the same way as in Example C1 except setting the ultimate temperature to 1200° C.

Comparative Example c1

The negative electrode carbonaceous material for comparison was produced in the same way as in Example B1 except using crystalline cellulose (manufactured by WAKO PURE CHEMICALS CO. LTD. in place of the shin of an orange.

Comparative Example c2

The negative electrode carbonaceous material for a non-aqueous liquid electrolyte secondary cell was produced in the same way as in Comparative Example c1 except setting the ultimate temperature to 1200° C.

Evaluation

Using the negative carbonaceous electrode material obtained in Examples C1 to C4 and Comparative Examples c1 and c2, test cells were prepared in the same way as in Examples A1 to A4 and Comparative Examples a1 and a2 for conducting negative electrode capacity tests.

TABLE 3

|  | raw materials used | sintering temperature (° C.) | negative electrode capacity (mAh/g) | volumetric increasing ratio (%) |
| --- | --- | --- | --- | --- |
| Ex. C1 | orange skin | 1100 | 395 | 19 (to Comp. Ex. c1) |
| Ex. C2 | orange skin | 1200 | 363 | 18 (to Comp. Ex. c2) |
| Ex. C3 | banana skin | 1100 | 380 | 14 (to Comp. Ex. c1) |
| Ex. C4 | banana skin | 1200 | 349 | 13 (to Comp. Ex. c2) |
| Comp. Ex. c1 | cryst. cellulose | 1100 | 332 | — |
| Comp. Ex. c2 | cryst. cellulose | 1200 | 308 | — |

It is seen from Table 3 that the negative electrode materials of Examples C1 to C4, prepared using the coffee beans or green tea leaves as raw materials exhibited a high load capacity as compared to the negative electrode materials of Comparative Examples c1 and c2 obtained by sintering crystalline cellulose at the same temperature.

EXAMPLE D1

The husks of cereals, sufficiently washed with lukewarm water and ethanol, was heated in a nitrogen stream at 500°

C. for 5 hours. The carbonized product was pulverized to powders, 10 g of which were charged into an alumina crucible and heated in a nitrogen stream of 10 liters/min at a temperature rising rate of 5° C./min to 1100° C. (ultimate temperature) which was maintained for one hour for sintering and carbonization. This gave a negative electrode carbonaceous material for a non-aqueous liquid electrolyte secondary cell.

EXAMPLE D2

The negative electrode carbonaceous material for a non-aqueous liquid electrolyte secondary cell was produced in the same way as in Example D1 except setting the ultimate temperature to 1200° C.

Comparative Example d1

The negative electrode carbonaceous material for comparison was produced in the same way as in Example B1 except using crystalline cellulose (manufactured by WAKO PURE CHEMICALS CO.LTD. for comparison.

Comparative Example d2

The negative electrode carbonaceous material for a non-aqueous liquid electrolyte secondary cell was produced in the same way as in Example D1 except setting the ultimate temperature to 1200° C.

Evaluation

Using the negative carbonaceous electrode material obtained in Examples D1 to D4 and Comparative Examples d1 and d2, test cells were prepared in the same way as in Examples A1 to A4 and Comparative Examples a1 and a2 for conducting negative electrode capacity tests. The results are shown in Table 4.

TABLE 4

| | raw materials used | sintering temperature (° C.) | negative electrode capacity (mAh/g) | volumetric increasing ratio (%) |
| --- | --- | --- | --- | --- |
| Ex. D1 | husks of cereals | 1100 | 447 | 35 (to Comp. Ex. d1) |
| Ex. D2 | husks of cereals | 1200 | 398 | 29 (to Comp. Ex. d2) |
| Comp. Ex. d1 | cryst. cellulose | 1100 | 332 | — |
| Comp. Ex. d2 | cryst. cellulose | 1200 | 308 | — |

It is seen from Table 4 that the negative electrode materials prepared using the husks of cereals after threshing the cereals such as rice or wheat exhibits a high negative electrode capacity as compared to the negative electrode materials of Comparative Examples d1 and d2 obtained on sintering the crystalline cellulose at the same temperature.

EXAMPLE E1

As a raw material of the carbonaceous materials, 1 part by weight of potassium hydroxide and 8 parts by weight of ethyl alcohol were mixed to 99 parts by weight of crystalline cellulose resin (manufactured by WAKO PURE CHEMICALS CO.LTD. and the resulting mixture was heated in a nitrogen atmosphere at 500° C. for 5 hours for carbonization. The carbonized product was pulverized and 1 g of the resulting powders was charged in an alumina crucible. The powders thus charged into the crucible were heated along with the crucible in a nitrogen stream of 3 liters/min to 1100° C. or 1200° C. (ultimate temperature) which was maintained for one hour for sintering and carbonization. Thus, a carbonaceous negative electrode material for a non-aqueous liquid electrolyte secondary cell could be produced.

EXAMPLE E2

The negative electrode carbonaceous material for a non-aqueous liquid electrolyte secondary cell was produced in the same way as in Example E1 except using a fibrous cellulose resin manufactured by SIGMA INC. in place of the crystalline cellulose resin.

EXAMPLE E3

The negative electrode carbonaceous material for a non-aqueous liquid electrolyte secondary cell was produced in the same way as in Example E1 except using sodium hydroxide in place of potassium hydroxide.

EXAMPLE 4

The negative electrode carbonaceous material for a non-aqueous liquid electrolyte secondary cell was produced in the same way as in Example E1 except using calcium hydroxide in place of potassium hydroxide.

EXAMPLE 5

The negative electrode carbonaceous material for a non-aqueous liquid electrolyte secondary cell was produced in the same way as in Example E1 except using magnesium hydroxide in place of potassium hydroxide.

EXAMPLE E6

The negative electrode carbonaceous material for a non-aqueous liquid electrolyte secondary cell was produced in the same way as in Example E1 except using aluminum hydroxide in place of potassium hydroxide.

EXAMPLE E7

The negative electrode carbonaceous material for a non-aqueous liquid electrolyte secondary cell was produced in the same way as in Example E1 except using silicic acid in place of potassium hydroxide.

EXAMPLE E8

The negative electrode carbonaceous material for a non-aqueous liquid electrolyte secondary cell was produced in the same way as in Example E1 except using phosphoric acid in place of potassium hydroxide.

EXAMPLE E9

The negative electrode carbonaceous material for a non-aqueous liquid electrolyte secondary cell was produced in the same way as in Example E1 except using sulfuric acid in place of potassium hydroxide.

EXAMPLE E10

The negative electrode carbonaceous material for a non-aqueous liquid electrolyte secondary cell was produced in the same way as in Example E1 except using 100 parts by weight of coffee beans washed with lukewarm water in place of 99 parts by weight of crystalline cellulose resin without using coffee beans washed with lukewarm water.

EXAMPLE E11

The negative electrode carbonaceous material for a non-aqueous liquid electrolyte secondary cell was produced in the same way as in Example E10 except using non-washed coffee beans in place of coffee beans washed with lukewarm water.

EXAMPLE E12

The negative electrodes carbonaceous material for a non-aqueous liquid electrolyte secondary cell was produced in the same way as in Example E10 except rising black tea leaves washed with water and ethyl alcohol in place of coffee beans washed with lukewarm water.

EXAMPLE E13

The negative electrode carbonaceous material for a non-aqueous liquid electrolyte secondary cell was produced in the same way as in Example E10 except using green tea leaves washed with water and ethyl alcohol in place of coffee beans washed with lukewarm water.

EXAMPLE E14

The negative electrode carbonaceous material for a non-aqueous liquid electrolyte secondary cell was produced in the same way as in Example E10 except using oranges washed with water and ethyl alcohol in place of coffee beans washed with lukewarm water.

EXAMPLE E15

The negative electrode carbonaceous material for a non-aqueous liquid electrolyte secondary cell was produced in the same way as in Example E10 except using sugar cane washed with water and ethyl alcohol in place of coffee beans washed with lukewarm water.

Comparative Example e1

A carbonaceous negative electrode material was produced in the same way as in Comparative Example e1 except using fibrous cellulose resin in place of the crystalline cellulose resin.

Evaluation

Using the negative carbonaceous electrode material obtained in Examples E1 to E4 and Comparative Examples e1 and e2, test cells were prepared in the same way as in Examples A1 to A4 and Comparative Examples a1 and a2 for conducting negative electrode capacity tests. The results are shown in Tables 5 and 6.

The amounts of metals, phosphorus and sulphur contained in each negative electrode material sintered at 1200° C. were measured by phosphorescent X-ray analyses (qualitative and quantitative analyses employing Rigaku X-Ray Spectrometer RIX3000. The results are shown in Tables 7, 8 and 9.

TABLE 5

|  | raw materials used | additives | sintering temperature (° C.) | charging/discharging efficiency (%) |
|---|---|---|---|---|
| Ex. E1 | cryst. cellulose resin | potassium hydroxide (1 wt %) | 1100 1200 | 78.6 77.2 |
| Ex. E2 | fibrous cellulose resin | potassium hydroxide (1 wt %) | 1100 1200 | 78.1 76.9 |
| Ex. E3 | cryst. cellulose resin | sodium hydroxide | 1100 1200 | 77.9 80.2 |
| Ex. E4 | cryst. cellulose resin | calcium hydroxide | 1100 1200 | 76.9 81.1 |
| Ex. E5 | cryst. cellulose resin | magnesium hydroxide | 1100 1200 | 72.9 74.3 |
| Ex. E6 | cryst. cellulose resin | aluminum hydroxide | 1100 1100 | 78.8 79.5 |
| Ex. E7 | cryst. cellulose resin | silicic acid | 1200 1100 | 72.5 77.4 |
| Ex. E8 | cryst. cellulose resin | phosphoric acid | 1200 1100 | 81.5 81.9 |
| Ex. E9 | cryst. cellulose resin | sulfuric acid | 1200 1100 | 76.6 77.3 |

TABLE 6

|  | raw materials used | additives | sintering temperature (° C.) | charging/discharging efficiency (%) | discharging capacity (mAh/g) |
|---|---|---|---|---|---|
| Ex. E10 | washed coffee beans | — | 1100 1200 | 83.0 80.3 | 488 407 |
| Ex. E11 | non-washed coffee beans | — | 1100 1200 | 82.5 80.3 | 472 399 |
| Ex. E12 | black tea leaves | — | 1100 1200 | 80.4 78.6 | 412 368 |
| Ex. E13 | green tea leaves | — | 1100 1200 | 80.2 78.3 | 405 361 |
| Ex. E14 | oranges | — | 1100 1200 | 79.8 78.4 | 395 363 |
| Ex. E15 | cane sugar | — | 1100 1200 | 81.0 79.5 | 425 387 |
| Comp. Ex. e1 | cryst. cellulose resin | — | 1100 1200 | 71.8 70.3 | 332 308 |
| Comp. Ex. e2 | fibrous cellulose resin | — | 1100 1200 | 71.4 69.9 | 325 302 |

TABLE 7

| elements | Ex. E1 | Ex. E2 | Ex. E3 | Ex. E4 | Ex. E5 | Ex. E6 |
|---|---|---|---|---|---|---|
| Na | 0.0078 | 0.0067 | 0.9927 | 0.0014 | 0.0051 | 0.0088 |
| K  | 0.9869 | 1.0074 | 0.0108 | 0.0044 | 0.0052 | 0.0091 |
| Ca | 0.0211 | 0.0225 | 0.0011 | 0.9799 | 0.0032 | 0.0029 |
| Mg | 0.0110 | 0.0097 | 0.0209 | 0.0082 | 1.0103 | 0.0069 |
| Al | 0.0032 | 0.0025 | 0.0009 | 0.0101 | 0.0048 | 0.9908 |
| Rb | — | — | — | — | — | — |
| Sr | — | — | — | — | — | — |
| Si | 0.0028 | 0.0013 | 0.0019 | 0.0217 | 0.0068 | 0.0024 |
| P  | 0.0193 | 0.0174 | 0.0122 | 0.0089 | 0.0061 | 0.0046 |
| S  | 0.0154 | 0.0166 | 0.0103 | 0.0115 | 0.0080 | 0.0059 |
| total | 1.0675 | 1.0841 | 1.0508 | 1.561 | 1.0495 | 1.0314 |

The numerals in Table 7 denote wt. %.

TABLE 8

| elements | Ex. E7 | Ex. E8 | Ex. E9 | Ex. E10 | Ex. E11 | Ex. E12 |
|---|---|---|---|---|---|---|
| Na | 0.0109 | 0.0074 | 0.0117 | — | 0.0058 | 0.0639 |
| K  | 0.0103 | 0.0067 | 0.0099 | 0.0219 | 0.817 | 0.0632 |
| Ca | 0.0055 | 0.0104 | 0.0064 | 0.4719 | 0.412 | 8.155 |
| Mg | 0.0093 | 0.0099 | 0.0111 | 0.0219 | 0.1412 | 0.3398 |
| Al | 0.0015 | 0.0041 | 0.0082 | 0.0066 | 0.0123 | 0.3811 |
| Rb | — | — | — | — | — | — |
| Sr | — | — | — | — | 0.0012 | 0.0143 |
| Si | 1.0041 | 0.0118 | 0.0109 | 0.0141 | 0.0012 | 0.1546 |
| P  | 0.0183 | 0.8891 | 0.0215 | 0.1194 | 0.0262 | 0.6788 |
| S  | 0.0091 | 0.0133 | 0.8300 | 0.1328 | 0.3708 | 0.2256 |
| total | 1.0700 | 0.9527 | 0.9097 | 1.9597 | 0.236 | 10.0763 |

The numerals in Table 8 denote wt %.

TABLE 9

| elements | Ex. 13 | Ex. 14 | Ex. 15 | Comp. Ex. e1 | Comp. Ex. e2 |
|---|---|---|---|---|---|
| Na | 0.0748 | 0.0333 | 0.3438 | 0.0094 | 0.0086 |
| K  | 2.2666 | 2.449 | 2.709 | 0.0053 | 0.0067 |
| Ca | 2.8426 | 14.779 | 0.5197 | 0.0197 | 0.0174 |
| Mg | 0.5147 | 0.3862 | 0.2418 | 0.0132 | 0.0151 |
| Al | 0.2077 | 0.3862 | 0.2418 | 0.0132 | 0.0151 |
| Rb | 0.0013 | 0.0023 | 0.0073 | — | — |
| Sr | 0.0023 | 0.1134 | 0.0011 | — | — |
| Si | 0.1435 | 0.0398 | 0.7054 | 0.0037 | 0.0049 |
| P  | 2.0986 | 0.4735 | 0.3479 | 0.0234 | 0.0301 |
| S  | 0.1181 | 0.1046 | 0.417 | 0.0168 | 0.0211 |
| total | 8.36391 | 18.389 | 5.3055 | 0.0963 | 0.1061 |

The numerals in Table 9 denote wt %.

It is seen from the results of Tables 5 to 9 that the negative electrode materials of Examples E1 to E15 exhibit a higher charging/discharging efficiency than that of the negative electrode materials of Comparative Examples e1 and e2 obtained on sintering crystalline cellulose or fibrous cellulose at the same temperature. In particular, the negative electrode materials of Examples E10 to E15, employing plant-origin high molecular materials, such as coffee beans, black tea, green tea, cane sugar and oranges, as the raw carbonaceous materials, exhibit higher charging/discharging capacity than that of the negative electrode materials of Comparative Examples e1 and e2

It is seen that, with the plant-origin high molecular materials used in Examples E10 to E15, namely the coffee beans, black tea, green tea, cane sugar and oranges, inherently contain metals, phosphorus and sulphur as ingredients, certain amounts of these elements may be maintained without using additives, such as KOH.

EXAMPLE F1

The coffee beans, sufficiently washed with lukewarm water, were carbonized by heating in a nitrogen stream at 500° C. for five hours. The carbonized product was pulverized and 10 g of the resulting powders was charged in an alumina crucible. The powders thus charged into the crucible were heated along with the crucible in a nitrogen stream of 10 liters/min to 1100° C. (ultimate temperature) which was maintained for one hour for sintering and carbonization. Thus, a carbonaceous negative electrode material for a non-aqueous liquid electrolyte secondary cell was produced.

EXAMPLE F2

The negative electrode carbonaceous material for a non-aqueous liquid electrolyte secondary cell was produced in the same way as in Example F1 except setting the ultimate temperature to 1200° C.

EXAMPLE F3

The negative electrode carbonaceous material for a non-aqueous liquid electrolyte secondary cell was produced in the same way as in Example F1 except using green tea leaves sufficiently washed with lukewarm water in place in place of coffee beans.

EXAMPLE F4

The negative electrode carbonaceous material for a non-aqueous liquid electrolyte secondary cell was produced in the same way as in Example F3 except setting the ultimate temperature to 1200° C.

EXAMPLE F5

As a raw material of the carbonaceous materials, 1 part by weight of potassium hydroxide and 8 parts by weight of ethyl alcohol were mixed to 99 parts by weight of crystalline cellulose resin (manufactured by WAKO PURE CHEMICALS CO. LTD. and the resulting mixture was heated in a nitrogen atmosphere at 500° C. for 5 hours for carbonization. The carbonized product was pulverized and 1 g of the resulting powders was charged in an alumina crucible. The powders thus charged into the crucible were heated along with the crucible in a nitrogen stream of 3 liters/min to 1100° C. or 1200° C. (ultimate temperature) which was maintained for one hour for sintering and carbonization. Thus, a carbonaceous negative electrode material for a non-aqueous liquid electrolyte secondary cell could be produced.

EXAMPLE F6

The negative electrode carbonaceous material for a non-aqueous liquid electrolyte secondary cell was produced in the same way as in Example F5 except using sodium hydroxide in place of potassium hydroxide.

EXAMPLE F7

The negative electrode carbonaceous material for a non-aqueous liquid electrolyte secondary cell was produced in the same way as in Example F5 except using calcium hydroxide in place of potassium hydroxide.

EXAMPLE F8

The negative electrode carbonaceous material for a non-aqueous liquid electrolyte secondary cell was produced in the same way as in Example E1 except using magnesium hydroxide in place of potassium hydroxide.

EXAMPLE F9

The negative electrode carbonaceous material for a non-aqueous liquid electrolyte secondary cell was produced in the same way as in Example F5 except using aluminum hydroxide in place of potassium hydroxide.

EXAMPLE F10

The negative electrode carbonaceous material for a non-aqueous liquid electrolyte secondary cell was produced in the same way as in Example F5 except using silicic acid in place of potassium hydroxide.

EXAMPLE F11

The negative electrode carbonaceous material for a non-aqueous liquid electrolyte secondary cell was produced in the same way as in Example E1 except using phosphoric acid in place of potassium hydroxide.

EXAMPLE F12

The negative electrode carbonaceous material for a non-aqueous liquid electrolyte secondary cell was produced in the same way as in Example F5 except using sulfuric acid in place of potassium hydroxide.

Comparative Example f1

The negative electrode carbonaceous material for comparison was produced in the same way as in Example F1 except using crystalline cellulose (manufactured by WAKO PURE CHEMICALS CO. LTD. in place of coffee beans for comparison.

Comparative Example f2

The negative electrode carbonaceous material for a non-aqueous liquid electrolyte secondary cell was produced in the same way as in Comparative Example f1 except setting the ultimate temperature to 1200° C.

Evaluation

Using the negative carbonaceous electrode material obtained in Examples F1 to F12 and Comparative Examples f1 and f2, test cells were prepared in the same way as in Examples A1 to A4 and Comparative Examples a1 and a2 for conducting negative electrode capacity tests. The results are shown in Table 4.

On the other hand, X-ray diffraction of powders of respective negative electrode materials was measured under the conditions of an X-ray source of CuKα(wavelength λ of 0.15418 nm); a scattering slit width (DS) of 0.5° (β); a sampling interval of 0.05°; a scanning speed of 1°/min; a scanning width of 10° to 40°; and a distance from the X-ray source to a sample of 185 mm (L).

The corrected X-ray diffraction pattern of powders of the negative electrode material of Example F1 is shown in FIG. 1, where a solid line curve represents a fitting curve. The graph was obtained by dividing the intensity I(θ) of the diffraction pattern by squares of the deflection factor, absorption factor and atomic scattering factor for correction. The as-corrected pattern Icorr (θ) exhibited a locally minimum value near 2θ of approximately 35°. This locally minimum value and the angle 2θ giving the locally minimum value were read as Ia and as θ1, respectively. For avoiding the effects of the noise in the signal, 15 to 35 point smoothing was carried out in a 2θ range of from 30° to 40°. From the smoothed value of Icorr (θ) was subtracted Ia to give an intensity which was then multiplied with $\sin^2\theta$ to give an as-corrected pattern.

In the corrected diffraction pattern, with a (002) peak top intensity $I_{max}$ in the vicinity of 25° of the 2θ value, the closest 2θ angle having an intensity of $I_{max}/2$ towards the low-angle side from the peak top position was read as θ0. The corrected pattern from θ0 to θ1 was fitted with two Gauss peaks, that is the (002) peak and a sub-peak lying between the angles of 30° and 32°. The area intensity of the sub-peak lying between 30° and 32° was divided by the area intensity of the produced (002) peak to find a relative intensity (%). The results are shown in Table 10.

Similarly, X-ray diffraction was measured of the negative electrode materials of Examples F2 to F12 and Comparative Examples f1 and f2. With the negative electrode materials of Examples F2 to F12. sub-peaks were observed between 30° and 32° of the 2θ diffraction angle, while no such sub-peak was observed with the negative electrode materials of Comparative Examples f1 and f2. In addition, with the negative electrode materials of Examples F2 to F12, the relative intensity of the sub-peak between 30° and 32° of the 2θ diffraction angle was found, as in Example F1. The results are also shown in Table 10.

TABLE 10

| | raw materials used | additives | sintering temperature (° C.) | negative electrode capacity (mAh/g) |
|---|---|---|---|---|
| Ex. F1 | coffee beans | — | 1100 | 488 |
| Ex. F2 | green tea leaves | — | 1200 | 407 |
| Ex. F3 | green tea leaves | — | 1100 | 412 |
| Ex. F4 | cryst. cellulose resin | — | 1200 | 368 |
| Ex. F5 | cryst. cellulose resin | potassium hydroxide | 1100 | 330 |
| | | | 1200 | 305 |
| Ex. F6 | cryst. cellulose resin | sodium hydroxide | 1100 | 335 |
| | | | 1200 | 304 |
| Ex. F7 | cryst. cellulose resin | calcium hydroxide | 1100 | 341 |
| | | | 1200 | 300 |
| Ex. F8 | cryst. cellulose resin | magnesium hydroxide | 1100 | 421 |
| | | | 1200 | 369 |
| Ex. F9 | cryst. cellulose resin | aluminum hydroxide | 1100 | 338 |
| | | | 1200 | 327 |
| Ex. F10 | cryst. cellulose resin | silicic acid | 1100 | 383 |
| | | | 1200 | 346 |
| Ex. F11 | cryst. cellulose resin | phosphoric acid | 1100 | 324 |
| | | | 1200 | 299 |
| Ex. F12 | cryst. cellulose resin | sulfuric acid | 1100 | 381 |
| | | | 1200 | 369 |
| Ex. f1 | | — | 1100 | 332 |
| Ex. f2 | | — | 1200 | 308 |

It is seen from Table 10 that, with the negative electrode materials of Examples F1 to F12having a diffraction peak between 30° and 32° of the 2θ diffraction angle in the X-ray (CuKα) diffraction pattern, the negative electrode capacity is significantly increased as compared with the negative electrode materials of Comparative Examples f1 and f2 not exhibiting relevant diffraction peaks.

We claim:

1. A negative electrode material for use in a non-aqueous liquid electrolyte secondary cell comprising a sintered and carbonized plant origin high molecular weight material obtained by:

provinding a sample of a plant origin high molecular weight material;

carbonizing the sample at a temperature of from about 300° C. to 800° C. in a vacuum or inert gas atmosphere for a period of hours to provide a carbonized sample;

pulverizing said carbonized sample to provide a pulverized product; and thereafter, sintering the pulverized product by heating the product in a vacuum or an inert gas atmosphere at a rate of not less than about 1° C. per minute until an elevated temperature of between about 700° to 3000° C. is reached and thereafter, maintaining the elevated temperature for a period of at least one hour to provide said sintered and carbonized plant-origin high molecular weight material.

2. A negative electrode material as defined in claim 1, wherein said plant-origin high molecular weight material is selected from the group consisting of coffee beans, tea leaves, cane sugar, corns, fruits, straws of cereals and husks of cereals.

3. A negative electrode material as defined in claim 1, further comprising a sum total of 0.2 to 20 wt % of at least one metal element selected from phosphorus and sulphur.

4. A negative electrode material as defined in claim 3, further comprising at least one additional metal element selected from the group consisting of Na, K, Ca, Mg, Al and Si.

5. A negative electrode material as defined in claim 4, wherein said sample comprises crystalline cellulose or fibrous cellulose admixed with at least one metal selected from phosphorus and sulphur.

6. A negative electrode material as defined in claim 4, wherein said sample comprises about 0.01 to 0.5 wt % of Na, calculated as element.

7. A negative electrode material as defined in claim 4, wherein said sample comprises about 0.01 to 3 wt % of K calculated as element.

8. A negative electrode material as defined in claim 4, wherein said sample comprises about 0.05 to 20 wt % of Ca calculated as element.

9. A negative electrode material as defined in claim 4, wherein said sample comprises about 0.02 to 1 wt % of Mg calculated as element.

10. A negative electrode material as defined in claim 4, wherein said sample comprises about 0.005 to 0.5 wt % of Al calculated as element.

11. A negative electrode material as defined in claim 1, wherein said sample comprises about 0.04 to 3 wt % of phosphorus calculated as element.

12. A negative electrode material as defined in claim 1, wherein said sample comprises about 0.03 to 0.5 wt % of sulphur calculated as element.

13. A negative electrode material as defined in claim 4, wherein said sample comprises about 0.01 to 1 wt % of Si calculated as element.

14. A negative electrode material as defined in claim 1, wherein said sintered and carbonized plant-origin high molecular weight material has a diffraction peak between 30° and 32° of the 2θ diffraction angle in the X-ray (CuKα) powder diffraction pattern.

15. A negative electrode material as defined in claim 14, wherein said diffraction peak has a diffraction peak intensity between 30° and 32° of the 2θ diffraction angle in the corrected X-ray (CuKα) powder diffraction pattern of not less than 2% of the intensity of the (002) diffraction peak.

16. A non-aqueous liquid electrolyte secondary cell having a positive electrode formed of a lithium compound oxide and a negative electrode comprising a negative electrode material as defined in claim 1.

17. A non-aqueous liquid electrolyte secondary cell having a positive electrode formed of a lithium compound oxide and a negative electrode comprising a negative electrode material as defined in claim 3.

18. A non-aqueous liquid electrolyte secondary cell having a positive electrode formed of a lithium compound oxide and a negative electrode comprising a negative electrode material as defined in claim 14.

* * * * *